Nov. 27, 1934.  R. L. TWEEDALE  1,981,887
VEHICLE JACKING DEVICE
Original Filed Feb. 3, 1931
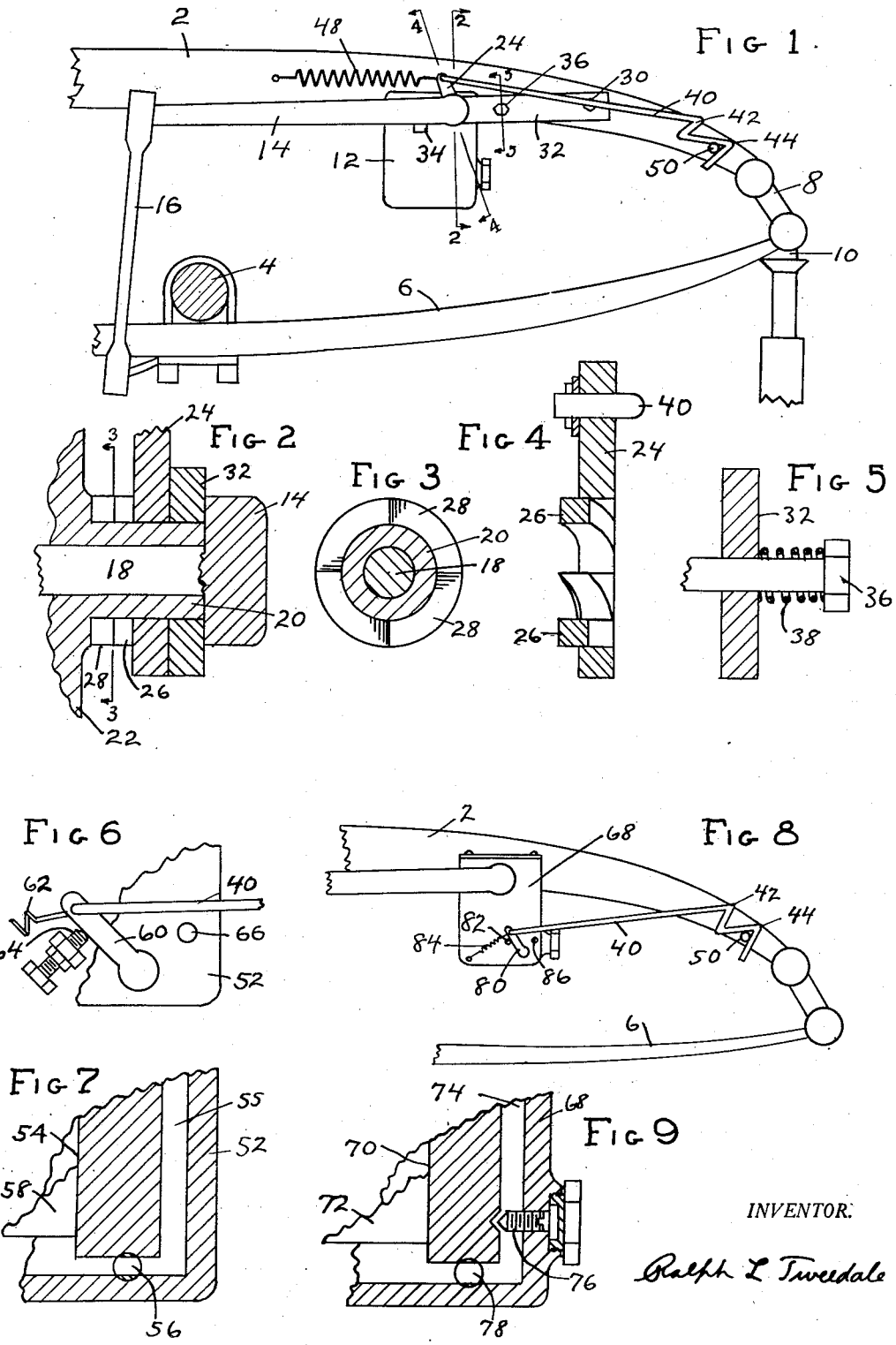
INVENTOR:
Ralph L. Tweedale Patented Nov. 27, 1934

1,981,887

UNITED STATES PATENT OFFICE 1,981,887

VEHICLE JACKING DEVICE

Ralph L. Tweedale, Washington, D. C.

Application February 3, 1931, Serial No. 513,342
Renewed March 30, 1933

23 Claims. (Cl. 188—88)

The invention relates to vehicles, more particularly of the automotive type and has for its object the provision of means for facilitating jacking up of a wheel of the vehicle. The invention is particularly adapted for application to a vehicle having a spring connection between the axle and frame, such as an automobile, and also having a yielding connection between the axle and frame, such as a shock absorber for example. It is an object of this invention to provide simple and reliable means composed of relatively few and inexpensive parts which will enable the vehicle to be jacked up by placing a jack under a readily accessible part of the vehicle frame. It is well known that considerable difficulty is experienced in jacking up the wheels of many automobiles, busses etc., due to the fact that the body and frame parts are constructed so as to overhang the axles and wheels to such an extent that placing a jack under the axle requires a good deal of skillful and sometimes exasperating manipulation from the remote end of an overlong jack handle. This difficulty is removed by this invention in that it enables the vehicle wheels to be raised by placing a jack under any part of the vehicle body or frame which may be most convenient.

It is also an object of this invention to provide means for at times locking together the axle and frame of a vehicle which means may be constructed of relatively few, small and inexpensive parts.

It is another object of this invention to provide means for locking together the relatively movable parts of an automobile shock absorber which may be readily made operative or inoperative at will by manipulation of a handle which is readily accessible.

Other objects will appear from the following description and drawing in which

Fig. 1 is a side view of part of an automobile embodying one form of my invention.

Fig. 2 is a fragmentary cross section on line 2—2 of Fig. 1.

Fig. 3 is a fragmentary cross section on line 3—3 of Fig. 2.

Fig. 4 is a fragmentary cross section on line 4—4 of Fig. 1.

Fig. 5 is a fragmentary cross section on line 5—5 of Fig. 1.

Fig. 6 is a fragmentary view of a shock absorber embodying a second form of the invention.

Fig. 7 is a vertical cross section of Fig. 6.

Fig. 8 is a side view of an automobile embodying a third form of the invention, and Fig. 9 is a fragmentary vertical cross section of the shock absorber shown in Fig. 8.

In the modification shown in Figs. 1 to 5, 2 represents the frame of an automobile having an axle 4 supporting the frame through the spring 6 and shackles 8. A step 10 is provided, which may be mounted on the spring as shown or may be mounted on the shackle, frame, or body for the purpose of receiving the head of a jack. 12 represents a shock absorber which may be of any type and having an arm 14 and a link 16 connecting the arm 14 with the axle 4. The arm 14 operates the inner works of the shock absorber through a shaft 18 (Fig. 2), pivoted in a bushing or boss 20 of the shock absorber housing 22. Rotatably mounted on the outside of boss 20 is a lever 24 having four helically shaped cam members 26 (Fig. 4). The cam members 26 made with four corresponding cam members 28 formed on the housing 22 so that when lever 24 is rotated clockwise in Fig. 1 the cam surfaces force the lever to slide axially to the right in Fig. 2. Fastened to the frame 2 by a bolt 30 is a locking lever 32 having an aperture through which the boss 20 extends and carrying a lug 34 adapted to engage the under side of arm 14 when the lever 32 is moved to the extreme right as shown in Fig. 2. A bolt 36 secured to the frame passes through the lever 32 and has mounted on it a spring 38 (Fig. 5) which normally keeps the lever 32 moved to the left in Fig. 2 so that the lug 34 does not engage the arm 14. An operating rod 40 having two kinks 42 and 44 is pivoted to the upper end of lever 24. A spring 48 has one end connected to the frame 2 and the other end connected to the upper end of lever 24 and acts to keep the kink 42 or the kink 44 engaged against a stop pin 50.

The operation of this modification is as follows: In the normal driving position the lever 40 has its kink 44 engaged with the pin 50 as shown. The spring 38 keeps lever 32 moved to the left as shown in Fig. 2 since the cams 26 and 28 are in closely nested relation. This leaves the arm 14 free for normal shock absorber action. When it is desired to jack up the axle 4 the lever 40 is moved to the position where kink 42 engages pin 50. This throws lever 24 clockwise in Fig. 1 and causes the cams 26 and 28 to shift the lever 24 and the lever 32 to the right in Fig. 2 so that lug 34 engages the under side of arm 14. With the parts positioned thus a jack may be placed under the step 10 and as the frame 2 is raised the axle 4 will be raised also because the arm 14 and link 16 now act as a rigid connection between the axle 4 and frame 2.

In the modification shown in Figs. 6 and 7 a hydraulic shock absorber has a housing 52 having a cylinder bore 54 and a restricted passage 55 restricted by the adjustable valve 56. The usual piston 58 operates in the cylinder 54 to force fluid through the passage 55 on the down stroke of the piston which occurs when the axle and frame move relatively away from each other. The valve 56 extends out through the housing 52 and has fastened to its outer end the lever 60. Lever 60 has connected to its upper end the operating rod 40, similar to the lever 40 of Fig. 1. A spring 62 normally holds the lever 60 against an adjustable stop 64 mounted on the housing 52. A fixed stop 66 prevents over motion of the lever 60 in a clockwise direction.

In operation of the modification of Figs. 6 and 7 the lever 60 is normally in the position shown against the stop 64. The amount of shock absorber action is adjusted by adjusting the stop 64 which varies the amount of opening of the valve 56 in its maximum open position against stop 64. When it is desired to jack up a wheel of the vehicle the lever 40 is pulled back to a position with kink 42 engaged with pin 50 (Fig. 1). This moves lever 60 and valve 56 to a position in which valve 56 is fully closed. The passage 55 is now closed which prevents downward motion of piston 58 thus effectively preventing movement of the axle away from the frame. Of course when the frame is jacked up the axle will also be raised as in the modification of Figs. 1 to 5. It will thus be seen that the valve 56 serves the dual purpose of regulating the amount of shock absorber action during normal operation of the vehicle and of locking the shock absorber so that it will act as a rigid connection between the frame and the axle, when it is desired to jack up the vehicle without having to put a jack under the axle.

In the modification of Figs. 8 and 9, 68 represents the housing of a hydraulic shock absorber having a cylinder bore 70 in which operates a piston 72. The piston 72 forces fluid through a passage 74 on the down stroke which occurs when the frame and axle move relatively away from each other. The passage 74 is restricted by the adjustable valve 76 of the usual type. An auxiliary valve 78 is provided in the passage 74 which is operated by the lever 80, in turn operated by the rod 40 and held normally against a stop 82 by a spring 84. The operation of this modification is obviously similar to that of Figs. 6 and 7 except that the adjusting of the normal restriction in passage 74 is done at valve 76 instead of at valve 78.

It is to be understood that the invention is not limited to the specific embodiments shown but may take other forms and modifications coming within the scope of the following claims.

I claim

1. In a wheeled vehicle having a frame, an axle, a spring connecting the frame and axle for relative movement, the combination of a shock absorber having relatively movable members yieldably connecting the frame and axle, means for locking the shock absorber members against relative movement in at least one direction and a member operable from a readily accessible point on the vehicle for controlling the locking means whereby the vehicle may be jacked up by applying a jack under the frame instead of under the axle.

2. A device for facilitating jacking of a vehicle having a frame, an axle, a spring and a shock absorber connecting the axle and frame comprising means for locking the shock absorber against relative movement of its members in at least one direction and a member operable from a point readily accessible on the vehicle for controlling the locking means whereby relative movement of the frame and axle may at times be inhibited.

3. A locking attachment for a shock absorber comprising a mechanical locking member moveable in one direction to a position in which the shock absorber is locked against movement in at least one direction and movable in the opposite direction to a position in which the shock absorber is free for normal operation, means for positively moving the member in at least one of the directions and a member for controlling said means.

4. A locking attachment for a shock absorber comprising a mechanical locking member movable in one direction to a position in which the shock absorber is locked against movement in at least one direction and movable in the opposite direction to a position in which the shock absorber is free for normal operation, means for positively moving the member in one direction, resilient means for moving the member in the opposite direction, and a member for controlling the first named means.

5. A locking mechanism for shock absorbers comprising a member movable to a first position for locking the shock absorber against relative movement of its members in at least one direction and movable to a second position for normal operation of the shock absorber, manually operable means for controlling the member, and means for normally retaining the member in the second position.

6. A locking mechanism for shock absorbers comprising a member movable to a first position for locking the shock absorber against relative movement of its members in at least one direction and movable to a second position for normal operation of the shock absorber, means for controlling the member, and a spring for normally retaining the member in the second position.

7. A locking mechanism for shock absorbers adapted to form a yielding connection between the frame and axle of a vehicle comprising a member movable to a first position for locking the shock absorber against relative movement of its members in at least one direction and movable to a second position for normal operation of the shock absorber, means for normally retaining the member in the second position and means for at times retaining the member in the first position whereby the axle and frame of the vehicle may be inextensibly connected for jacking purposes.

8. A locking mechanism for shock absorbers adapted to form a yielding connection between the frame and axle of a vehicle comprising a member movable to a first position for locking the shock absorber against relative movement of its members in at least one direction and movable to a second position for normal operation of the shock absorber, a spring for normally retaining the member in the second position and means for at times retaining the member in the first position whereby the axle and frame of the vehicle may be inextensibly connected for jacking purposes.

9. A locking mechanism adapted to form a yielding connection between the frame and axle of a vehicle and having a restricted passage for a fluid comprising means for at times completely closing the passage and a member manually operable from a readily accessible point on the vehicle for controlling said means whereby the axle and frame of the vehicle may be inextensibly connected for jacking purposes.

10. A hydraulic shock absorber adapted to form a yielding connection between the frame and axle of a vehicle and having a passage with an adjustable restriction therein for governing the flow of fluid therethrough comprising an auxiliary valve member for completely closing the passage and means manually operable from a readily accessible point on the vehicle for at times operating the valve to close the passage whereby the axle and frame of the vehicle may be inextensibly connected for jacking purposes.

11. A hydraulic shock absorber adapted to form a yielding connection between the frame and axle of a vehicle and having a passage for governing the flow of fluid therethrough, including a shut-off valve in the passage movable to a first position for closing the passage and movable to a second position for restricting the flow of fluid through the passage, means manually operable from a readily accessible point on the vehicle for controlling the valve and means for precisely adjusting the second position to vary the amount of restriction of the passage so that when the valve is moved to the second position the shock absorber acts normally and when the valve is moved to the first position the axle and frame of the vehicle are inextensibly connected for jacking purposes.

12. A hydraulic shock absorber adapted to form a yielding connection between the frame and axle of a vehicle and comprising a passage for the flow of fluid therethrough, a valve for completely shutting off the flow of fluid in the passage, and means manually operable from a readily accessible point on the vehicle for controlling the valve whereby the axle and frame of a vehicle may be inextensibly connected for jacking purposes.

13. A locking attachment for shock absorbers which are adapted to form a yielding connection between the frame and axle of a vehicle, said attachment comprising a member coacting with a movable member of the shock absorber to mechanically block the motion of the movable member in at least one direction, and a control device operable from a readily accessible point on the vehicle for moving the first member into and out of blocking position.

14. In a hydraulic shock absorber adapted to form a yielding connection between the frame and axle of a vehicle, and having a piston for forcing liquid through a passage, the combination of means for variably restricting the passage, said means being also adapted to completely close the passage and a control device operable from a readily accessible point on the vehicle for operating said means from a position in which the restriction is suitable for shock absorbing purposes to a position in which the passage is completely closed for inextensibly connecting the axle to the frame for jacking purposes.

15. In a hydraulic shock absorber adapted to form a yielding connection between the frame and axle of a vehicle, and having a piston for forcing liquid through a passage, the combination of means for variably restricting the passage and means adapted to completely close the passage and a control device operable from a readily accessible point on the vehicle for operating the second means from a position in which the fluid flow through the passage is controlled by the first means for shock absorbing purposes to a position in which the passage is completely closed for inextensibly connecting the axle to the frame for jacking purposes.

16. In a hydraulic shock absorber adapted to form a yielding connection between the frame and axle of a vehicle, and having means for causing fluid flow in accordance with the relative movement of the axle and frame, the combination of means for controlling the fluid flow movable to a first position for normal shock absorber action and movable to a second position for completely preventing fluid flow in at least one direction, and a control device for at times retaining said means in the second position whereby the frame and axle of the vehicle are immovable in at least one direction.

17. Locking means for shock absorbers which are adapted to form a yielding connection between the frame and axle of vehicle, said means comprising a member non-rotatably connected with the frame of the vehicle, blocking means operatively connected to said member and movable therewith into and out of blocking engagement with a movable member of the shock absorber, and a control device for moving the member and blocking means into and out of operative position.

18. In a vehicle having a plurality of wheels, a frame, resilient means supporting the frame on the wheels, and including means forming a yielding connection between the wheels and frame and comprising two relatively movable rigid members, the combination of means for positively locking said members against relative movement in at least one direction and control means for placing the locking means into and out of operation.

19. In a vehicle having a plurality of wheels, a frame, resilient means supporting the frame on the wheels, and including means forming a yielding connection between the wheels and frame and comprising two relatively movable rigid members, the combination of means for positively locking said members against relative movement in at least one direction and control means operable from a readily accessible point on the vehicle for placing the locking means into and out of operation.

20. In a vehicle having a plurality of wheels, a frame, resilient means supporting the frame on the wheels and including means forming a yielding connection between the wheels and frame comprising two relatively movable rigid members one of which is fixed relative to the frame and the other of which partakes of pivotal movement relative to the first member upon relative movement between the wheels and frame the combination of means for positively locking said members against relative movement in at least one direction and control means for placing the locking means into and out of operation.

21. In a vehicle having a plurality of wheels, a frame, resilient means supporting the frame on the wheels and including means forming a yielding connection between the wheels and frame comprising two rigid members partaking of pivotal relative movement upon relative movement between the wheel and the frame, the combination of means for positively locking said members against relative movement in at least one direction and control means for placing the locking means into and out of operation.

22. In a vehicle having a frame, a road wheel, an axle for the road wheel, two relatively movable members forming a yielding connection between the frame and axle and resilient means yieldably supporting the frame; the combination of means for positively locking said members against relative movement in at least one direction and control means for placing the locking means into and out of operation.

23. In a vehicle the combination of a frame, a road wheel, an axle for the road wheel, means including two rigid members normally partaking of relative movement in accordance with relative movement between the frame and axle and forming a yielding connection between the frame and axle, resilient means yieldably supporting the frame and a device for facilitating jacking of the wheel including means for positively locking said members against relative movement in at least one direction.

RALPH L. TWEEDALE.